INVENTOR.
THOMAS PROCTOR

INVENTOR.
THOMAS PROCTOR
BY
Lindenberg & Freilich
ATTORNEYS

INVENTOR.
THOMAS PROCTOR
BY
Lindenberg & Freilich
ATTORNEYS

United States Patent Office 3,559,188
Patented Jan. 26, 1971

3,559,188
SUPERVISORY SYSTEM FOR TIME-SHARED NUMERICAL CONTROL SYSTEM
Thomas Proctor, Lyndhurst, Ohio, assignor, by mesne assignments, to Allen-Bradley Company, Milwaukee, Wis., a corporation of Wisconsin
Filed Feb. 29, 1968, Ser. No. 709,465
Int. Cl. G06f 15/46
U.S. Cl. 340—172.5                  8 Claims

ABSTRACT OF THE DISCLOSURE

In a numerical control system of the type wherein a central processor provides control instruction, on a time-shared basis, to a plurality of remotely located numerically controlled machine tools, provision is made for gathering and processing data from the various machine tool locations of a type which is suitable for management control use.

BACKGROUND OF THE INVENTION

This invention relates to numerical control systems and more particularly to improvements in numerical control systems which are operated in a time-shared manner from a central processor.

There are two types of operations of numerically controlled machine tools at present in which central processing control on a time-shared basis can be advantageously employed. One of these is the machine shop operation wherein a number of the shops are scattered over an area within a city, each one duplicating the director or tape handling apparatus and associated controls for controlling a numerical machine tool. Another of these is the system employed in large plants where at different machine shop locations throughout the plant these numerically controlled machine tools have associated therewith a director. Advantage may be taken of the high speed data processing capabilities of present day computer techniques for eliminating the necessity for a director at each machine tool location by instead time-sharing a central processor among a plurality of machine tools.

In U.S. Pat. No. 3,465,298 issued on an application for patent, Ser. No. 590,142, by Norman L. La Duke and Thomas Proctor, which was filed on Oct. 26, 1966, and which is entitled "Time-Shared Automatic Machine Tool Control System," there is described a system wherein a central computer or processor can service a number of numerically controlled machine tools which are located either within a single plant or scattered over a geographical area. Since the central processor has the capacity for storing a great deal of data, advantage of this is taken by having the central processor store the data which can be fed in predetermined control increments to each one of the numerically controlled machine tools as they require it.

Proper management and supervisory control of machine shop operations require that information be derived and/or recorded from each machine tool which is used. For example, the cost of the manufacture of a part which is made on the machine tool requires that the time spent by an operator in making that part be known. The cost of operating a machine shop requires knowledge of the time over which the machine tool is operating as well as of the time that the machine tool is not being used. With the systems used heretofore, each machine tool operator maintained the required records and turned them in to management. While with a central processor such a system may still be employed, it is more desirable to make the recording of this data more automatic and also more accurate. Further, the central processor makes the information available instantaneously and at a single location instead of requiring a wait for collection and collation of reports.

OBJECTS AND SUMMARY OF THE INVENTION

An object of this invention is the provision of a time-shared numerical control system which can gather and display data for management.

Yet another object of this invention is the provision of a time-shared numerical control system wherein data is gathered from each machine tool location, which is controlled at the central processor, and is made available for use by management.

The foregoing and other objects of the invention are achieved by generating signals at the machine tool location, which are transmitted to the central processor. These signals are recognized and are used to initiate logical operations to update previously acquired information. The information resulting is then stored and/or displayed.

DESCRIPTION OF THE PREFERRED EMBODIMENTS

Figure 1:
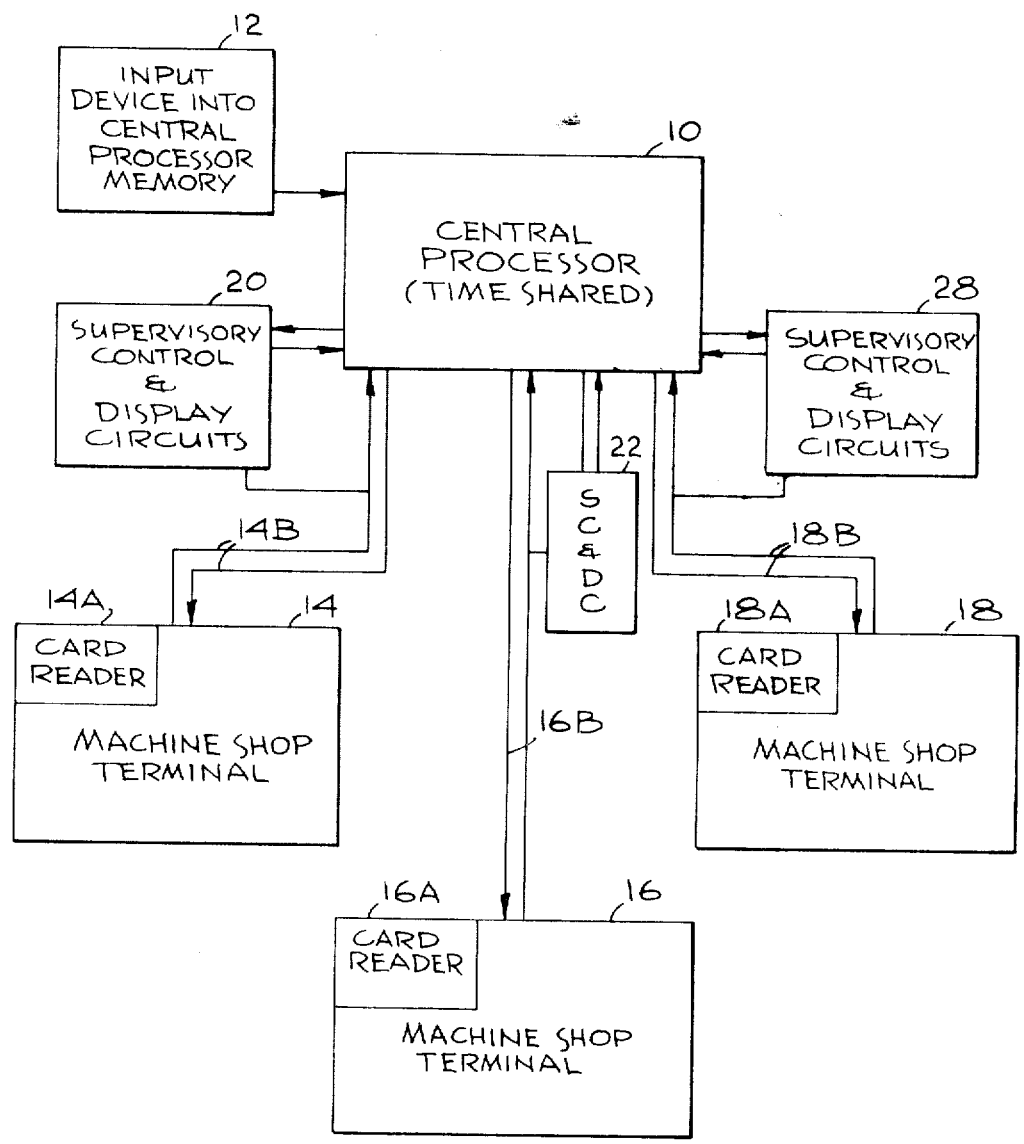
FIG. 1 is a block diagram of a time-shared numerical control system employing the invention.

FIG. 1 is a block schematic diagram of a time-shared automatic machine tool control system, which is identical to the one found in U.S. Pat. No. 3,465,298 issued on application Ser. No. 590,142, filed Oct. 26, 1966, by La Duke and Proctor except for the showing of supervisor display and control circuits. It is being described here for the purpose of making description of the improvement therein which follows more clear. The central processor 10 effectively has a computer memory system, with the usual data read-in and read-out capability. The computer memory has stored therein a plurality of machine tool programs. The format for each program which is stored is preferably digital, being for example, either the EIA standard format (BCD) or a fixed sequential binary format. Each program is broken down into program segments, each of which actually consists of digital words representing instructions to the machine tool X, Y, and Z axes, i.e., command words and sign words to indicate the distance and direction of motion of the machine tool along these three axes, and a feedrate word indicative of the rate at which motion is to occur. Each program segment represents motion required for a traverse along a line without changing direction, or along a curve. The last program segment will include an "end of program" code word.

Each program occupies a predetermined region of the memory of the central processor, with the program segments being stored sequentially. Parts which are to be made may be identified by a part number and an associated address indicative of the location in memory where instructions for machining the part are to be found. Each one of the machine shop terminals, respectively 14, 16, 18, has a list of these part numbers and addresses within the central processing memory for the beginning of the program, or the first program segment for each one of all of the programs which are stored in this memory. Each machine shop terminal may address the memory of the central processor with a part number and the address of a program which is desired. If the program address is stored on punched cards, the selected program address card is inserted in a punch card reader, respectively 14A, 16A, 18A, and the address is read over the respective communicating lines 14B, 16B, 18B, which couple each one of the respective machine shop terminals to the central processor. Also a keyboard may be used for transmitting part number and address information. The central processor has provision for storing these addresses and for sequentially addressing the memory and sequentially reading out the beginning of the stored program. The central processor divides the motion command words into shorter interval command words which command motion during a predetermined interval determined, for example, as 15 milliseconds. These shorter interval command words, together with the instruction information and the signs, are sent back to the machine shop terminals, where they are executed. The machine shop terminal then sends back a request for further data, and this is processed. The stored address at the central processor is updated, as required, so that the successive segment of a complete program may be read out as required by the machine tool, for executing the program.

An exemplification of the format for the program code, which may be stored in the processor memory, is described at some length in U.S. Pat. No. 3,079,522 to McGarrell. It is assumed that, as previously indicated, a plurality of programs are stored in the central processor memory. Each one of the machine shop terminals sends its requests for a program, which is the coded address of the program, to the central processor over the respective lines 14B, 16B, 18B.

In accordance with this invention, there are provided, at the central processor 10 for each machine shop terminal, supervisor control and display circuits. For machine shop terminal 14, there is provided a supervisor control and display circuit 20, which is located at the central processor. Similarly, for the respective machine shop terminals 16 and 18, there are provided the respective supervisor control and display circuits 22 and 28. These circuits are connected to receive signals from the respective machine shop terminals. These signals are decoded for the purpose of timing the various actions required in the processing of machining a part, as well as in keeping count of the parts which are completed or not completed. These circuits are connected to the transmission lines from the machine shop terminals and also to the central processor to avail themselves of the processor memory. Thus, a means is afforded, in accordance with this invention, for communicating with a plurality of machine shop terminals and providing a centrally located position supervisory data.

In the description of this invention which follows, it will be assumed that there is transmitted to the central processor from the machine shop terminal binary data, which may be in the form of binary words, and each binary bit of said data is accompanied by a clock pulse. To effectuate this, the data is transmitted serially over one line, and clock pulses transmitted serially over a second line. However, this is not to be considered as a restriction on the invention, since techniques are presently well known for receiving and storing binary data in a register and then clocking it out of said register serially, whereby each data pulse is accompanied by a clock pulse.

For the purpose of explaining this invention, it will be assumed that a four-bit code is used for informing the supervisor control circuits as to the operation at the machine shop terminal which is to be monitored. A part number is assigned to a part which is to be machined. The part number has as many bits as are required. For the purposes of this invention, it can be assumed that the part number also identifies the address in memory, or itself serves as the address, whereby certain information can be called out of this address of the memory, such as the information stored previously in connection with the part number which is to be machined, which information is to be updated by the ensuing operation at the machine shop location. The table that follows indicates the significance of the four-bit code which is employed herein.

| Code | Meaning |
|------|---------|
| 0001 | Clear for New Operation |
| 0010 | Set-up Begun |
| 0011 | Part Being Machined |
| 1001 | Part Finished |
| 0101 | Abort |
| 0100 | Scrap |
| 1000 | Feedrate Monitor Signal |

Figure 2:
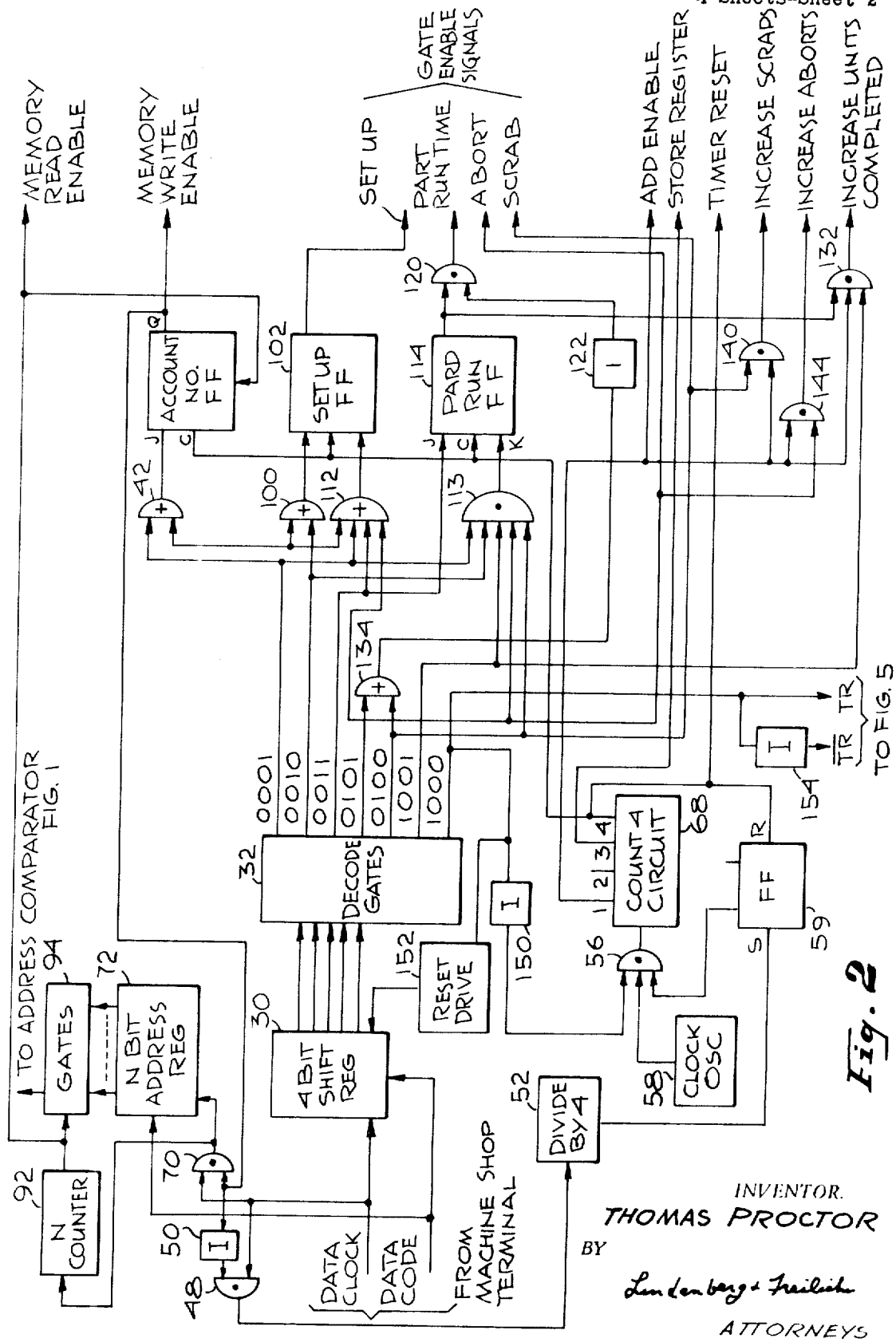
FIG. 2 is a block schematic diagram of the decoding logic employed with this invention.
Figure 3:
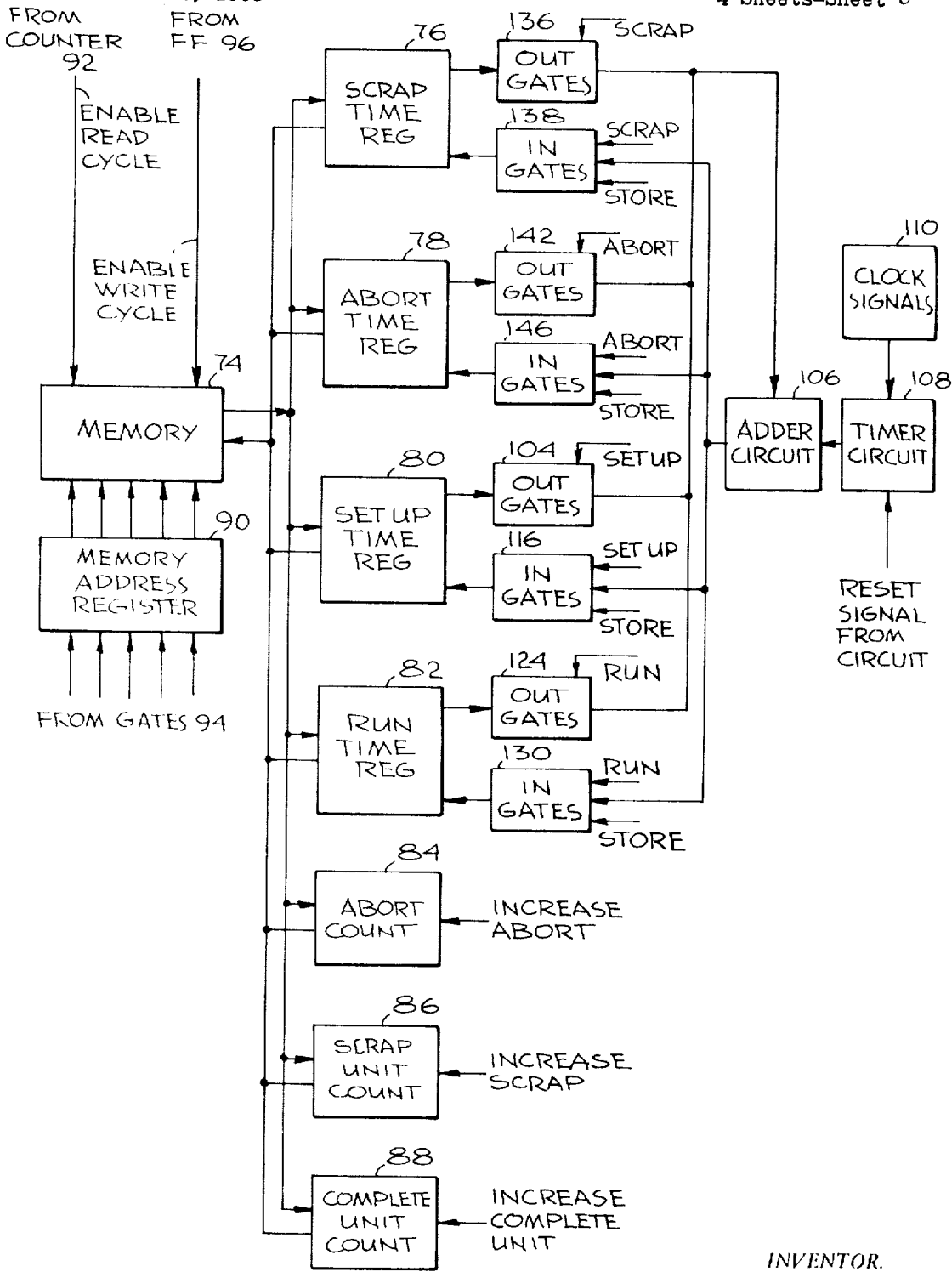
FIG. 3 is a block schematic diagram of the storage, timing and adding arrangement employed with this invention.

FIGS. 2 and 3 will be described together. FIG. 2 is a block schematic diagram of a circuit arrangement at the central processor which receives signals from a machine shop terminal, decodes the signals, and initiates operations in accordance therewith. FIG. 3 is a block schematic diagram of the circuitry which responds to the decoded signals to update previous information on a particular part being machined.

Assume that it is desired to machine a part. At a machine shop terminal, a card is inserted in a card reader, or a keyboard is actuated, to first transmit to the central processor a four-bit code, 0001. This four-bit code is followed by the N bit code representing a part identification number, which corresponds to the address assigned to information for that part, in the central processor memory.

Figure 4:
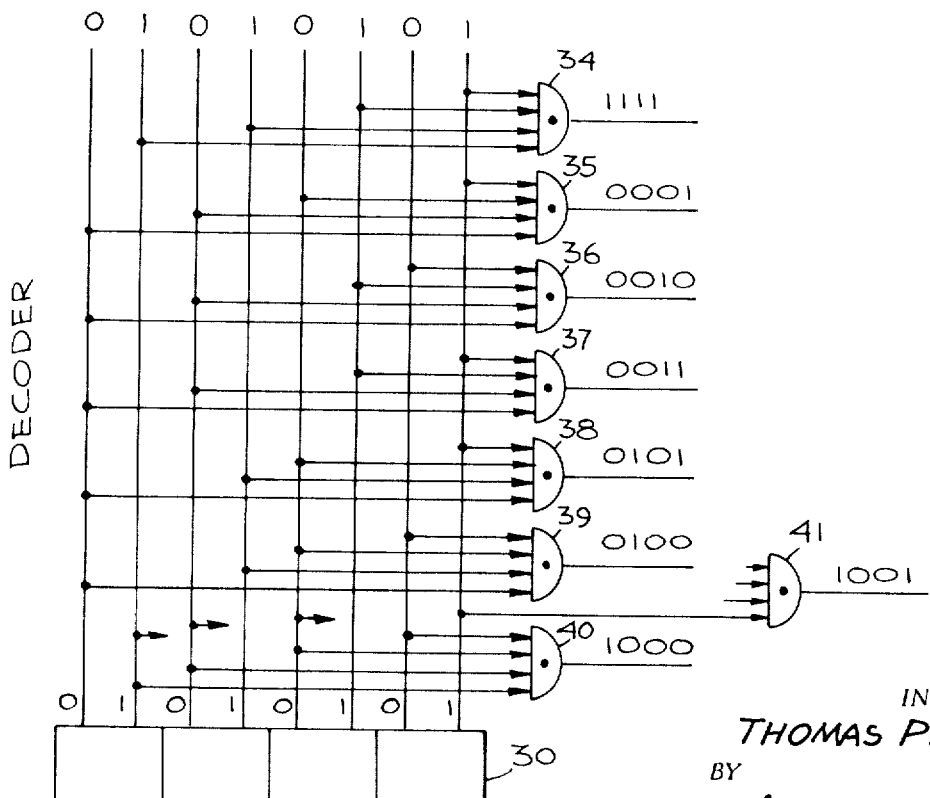
FIG. 4 is a schematic diagram of gate logic which is used.

Referring to FIG. 2, the gated data clock and data code signals are applied to a four-bit shift register 30, which in turn applies its contents to a set of decoding gates 32. The manner of deriving the gated data clock is as follows. The data clock line coming from the machine shop is connected to an AND gate 48. The other input to that AND gate is the output of an inverter 50. The input to the inverter is the Q or set output of the count number flip-flop 46. Accordingly, before flip-flop 46 is driven to its set state, and as data clock pulses are being received from the machine shop terminal, AND gate is enabled to pass these data clock pulses to a shift register 30. The decoding gates are shown in FIG. 4 and comprise the respective AND gates 34, 35, 36, 37, 38, 39, and 40. Each one of these is connected to receive four outputs from the flip-flop stages of the register 30; the selection of this output determines which one of the outputs of these AND gates is enabled. Thus, the input to AND gate 35 comprises the "one" output of a first flip-flop stage of the register, and the zero output of the remaining flip-flop stages of the register.

The 0001 output of the decoding gates is applied to an OR gate 42. The output of OR gate 42 is applied to the J input terminal of an account number flip-flop 46. This flip-flop will be set when a clock pulse is received. The manner of deriving the clock pulse is as follows. The gated data clock signal from AND gate 48 is applied to a "divide by four" circuit 52. In response to the fourth gated data clock pulse, an output from the "divide by four" circuit is applied to set a flip-flop 54. This enables an AND gate 56 to apply pulses, which are received from a clock oscillator 58, to a "count four" counter 68. The counter will cycle through its four counts in response to the clock pulses. Upon the occurrence of the fourth count, it resets flip-flop 54, and AND gate 56 is no longer enabled.

Accordingly, after the four bits of the incoming code have been received, the "count four" counter is enabled, and it provides as its output four clock pulses. The fourth clock pulse causes the account number flip-flop 46 to be driven to its set state, at which time its Q output is high and applies an output to the inverter 50, whereby the AND gate 48 is no longer enabled. In addition, the Q output of the account number flip-flop 46 is applied to an AND gate 70 to enable it to pass the part number binary signals which are next to be received from the machine shop to an N bit address register 72. In addition, the account number flip-flop 46 provides an enable signal to a memory circuit 74, as shown in FIG. 3, whereby it is enabled to enter data which is stored in a plurality of registers, respectively 76, 78, 80, 82, 84, 86, and 88, at a location determined by the address in the memory address register 90 which is there from a preceding supervisory operation.

The "count four" counter and the "divide by four" circuit can both comprise four-bit counters usually made up of two flip-flop circuits arranged so that one drives the other with its output.

The number of the part to be machined is next transmitted over the lines from the machine shop. It should be appreciated that this transmission can follow within a very short interval of the transmission of the 0001 code, since the set-up operation which occurs pursuant thereto does not take more than a few milliseconds to accomplish. The code for the part number can now be entered into the N bit address register 72, which has its input connected to the data code line. The input is clocked by data clock pulses which can now pass through the gate 70. While the data code is being entered into the N bit address register 72, the clock pulses which are applied thereto from the gate 70 are also applied to an N counter 92. This counter serves the function of insuring that the required number of bits are entered into the N bit address register. When it reaches its total N count, the N counter 92 applies an enabling signal to a set of gates 94, whose function is merely to transfer the contents of the address register 72 to the memory address register 90.

The output of the N counter also applies a read pulse to the memory circuit 74, whereby it is enabled to read from the location therein indicated by the memory address register 90 previously accumulated information with respect to the part whose number has just been entered into the address register. This information is read out and into the respective reigsters 76 through 88. The register 76 stores scrap time. This is the time that was used up in machining a part which for some reason could not thereafter be used and was thrown away. The register 78 stores the abort time. This is the running time which has elapsed in machining a part until the operation is aborted. The part may be used again. Register 80 stores set-up time, or the time required to mount a work piece on the machine tool table.

Register 82 is a run-time register, and it stores the time required for making a part. Register 84 is an abort counter register and is nothing more than a counter for accumulating the number of parts which have been aborted.

Similarly, scrap unit counter 86 and complete unit counter 88 are counters which accumulate the respective number of units which are scrapped and the number of units which are completed.

The memory represented by the block diagram 74 is illustrative of any of the well known types of memories which are commercially available and which may be employed with the present invention. Such memories may be, for example, magnetic core memories which can store up to 128 bit words. A word of such length may be divided into seven parts, each one of which is assigned to a different one of the registers 76 through 88. Thus, while these registers are shown as seven different registers, it can be one single lengthy register into which a word is entered, the parts of which represent the data designated by the register titles, and which parts may be individually extracted for display or for operation by suitable gating circuitry, if desired.

If the memory 74 is a serial memory, such as a disc or drum, the data can be readily entered into the respective registers by well known gating circuitry which will commutate both the output from the memory into the respective registers and the input into the memory when the write operation occurs.

In short, the operation of the memory and the associated addressing circuitry is well known and "state of the art," and therefore it need not be described here.

The next four-bit code which is to be received from the machine shop location is the code representing the fact that the set-up operation has begun. This is the 0010 code word. This is entered into the four-bit shift register 30, decoded by the gates 32, whereby the 0010 line is high. The 0010 line is connected to an OR gate 100, the output of which is applied to the J input of a set-up flip-flop 102. The "count four" counter 68 is again enabled in the same manner as before and, upon attaining its fourth count, causes the set-up flip-flop 102 to be set with its Q output high. This flip-flop Q output enables the output gates 104, which are connected to the output of the set-up time register 80, whereby these gates can transfer the contents of the set-up time register into an adder circuit 106. The fourth output of the "count four" counter 68 also serves to reset a timer circuit 108. The timer circuit is a counter which responds to clock signals received from a source 110. It counts in unit time in response to these clock signals and its output is applied to an adder circuit 106. However, this adder circuit cannot add the timer circuit output to the contents of the adder circuit, which is now set-up time, until an "add enable" signal is received.

When the machine tool operator has completed his set-up operation, he inserts a card in the card reader or actuates a keyboard to signal the fact by transmitting a 0011 or begin part code. This code is applied to an OR gate 112 whose output is applied to the K input terminal of the set-up flip-flop 102. The 0011 line is also connected to the J terminal of a part-run flip-flop 114. The "count four" counter is enabled to start counting. Its first count serves as an "add enable" signal to the adder circuit 106, whereby the timer circuit output and the set-up time are added. The "count four" counter then continues until it attains its number three count, at which time its output is applied to all of the input gates which are associated with the registers in FIG. 3, and more particularly with the input gate 116. The other required enabling input to this gate is the set-up signal from the Q output of flip-flop 102. Accordingly, the sum now present in the adder circuit 106 is reentered into the set-up time register 80.

As the "count four" counter continues to its fourth count, it causes the set-up flip-flop 102 to be reset and the part-run flip-flop 114 to be set. The set or Q output of the part-run flip-flop 114 is applied to an AND gate 120. This AND gate also receives the output of an inverter circuit 122. In the absence of an input to the inverter circuit, the AND gate 120 is enabled to apply a "part-run time" output signal to the output gates 124, which are connected to the output of the run-time register 82. As a result, the contents of the run-time register are inserted into the adder circuit 106. The timer 108 is also reset again by the fourth count of the "count four" counter 68. Accordingly, run time for the actual machining operation is now taking place.

If the part is successfully machined and no further parts are to be machined, then a part completion code is transmitted. This code may be 1001. This code serves the purpose of causing the "count four" counter 68 to recycle. When the "count four" counter produces its first count output, the adder is able to add the timer count to the previous run time count. When the third count of the "count four" counter is attained, the total count in the arithmetic adder is restored back to the run time register through its AND gates 130. This code also is applied to an OR gate 113 whose output is connected to the K terminal of the part-run flip-flop 114. This flip-flop is then reset.

Alternative to the above, the next part to be machined is signalled by the 0001 code followed by the part number. This also serves to set up the decoder circuits for a new operation.

It should be noted that the "one" count output of the counter 68 is applied to an AND gate 132. A second input to this AND gate is the Q output of the flip-flop 114. A third input to this AND gate is 1001 output of the decode gates. The output of the AND gate 132 is applied to the "complete unit count" counter 88 to increase its count by one.

The next appearance of the clear code 0001 followed by a part-run code enables the account number flip-flop 46 to be set, whereby the memory is able to record the contents of the respective registers 76 through 88.

Should it happen that the work piece being machined is spoiled as a result of some defective operation, then the machine tool operator scraps the part. He inserts a card in the card reader which transmits a scrap code, 0100. This scrap code is decoded and applied to an OR gate 134 and also to OR 113. The output of the OR gate 134 is applied to the inverter 122 whereby the gate 120, which enables the output gates of the run-time register, is disenabled. This immediately removes the run-time input from the adder circuit. In its place 0100 scrap signal enables the output gates 136 of the scrap time register, whereupon the scrap time is applied to the adder circuit. The scrap code also enables the "count four" counter to commence counting. Accordingly, when the first count output is received, the adder circuit can add the contents of the timer circuit to the accumulated scrap time. Upon the occurrence of the third output of the "count four" counter, the contents of the adder are returned to the scrap time register through its input gates 138. Upon the occurrence of the fourth count of the "count four" counter, flip-flops 102 and 114 are reset.

A gate 140 also receives the 0100 output of the decode gates and the first count of the "count four" counter, whereupon its output increases the scrap unit count by one in the counter 86.

Should an abort operation occur, then the abort code 0101 is transmitted by the machine tool operator by inserting the proper card or punching the proper keys on the keyboard. This energizes the 0101 line output of the decode gates 32. The OR gate 134 once again functions to energize the inverter circuit 122, whereby the part-run time gates are disenabled. The OR gates 112 and 113 also receive the 0101 signal, and thus flip-flops 102 and 114 are reset. The abort signal enables abort gates 142, whereby the contents of the abort time register 78 are inserted in the adder circuit. The first count of the "count four" counter causes the adder to add the time which is elapsed to the abort time. The first count of the counter also serves as an enabling input to an AND gate 144. Its second input is the abort signal output of the decode gates. The output of the AND gate 144 increases the count in the abort counter 84 by one. The third count of the "count four" counter causes entry of the total in the adder circuit 106 into the abort time register through the input gates 146.

The arrangement described can also be employed for the purpose of determining whether or not a machine tool is operating at its maximum feedrate time or at something less than its maximum feedrate time. Each machine tool which is numerically controlled is equipped with a feedrate override. This is employed to slow down the operation of the machine tool to a value less than that which is in the record or stored program employed for controlling the machine tool. Such manual override of the feedrate may be employed where, for example, the hardness of the work piece to be machined is higher than that for which the program was initially devised, or for a different type of tool, or for reasons of preservation of the machine or tool in good operating condition. It is important to know whether the machine is being operated at the proper feedrate, since this reflects into the time that the machine is used and therefore in the expense of operation.

The previously mentioned patent application, Ser. No. 590,142, describes the manner in which a central processor emits instructions to a machine tool, which instructions require a predetermined interval of time to be carried out; that is, by way of example, the central processor would emit control instructions for 15 millisecond intervals. At the end of that time, a machine tool would request a further 15 millisecond interval of control instructions. This operation would occur from the start to the end of the control instructions.

Now if the machine tool operator is permitting his machine to operate at the prescribed feedrate, then the machine tool will emit requests for control information every 15 milliseconds. If the feedrate is being overridden by the operator, then it will take longer than 15 milliseconds to execute the command signals emitted by the central processor. Accordingly, by timing the interval between the request signals for command instructions, one can determine whether or not a machine is being operated at the programmed feedrate and, if not, at what percentage of the program feedrate is the feedrate being operated.

The request signal from a machine tool is designated as a TR code and it is 1000.

Since this code will occur after the part-run time has been initiated, it is desirable to prevent the "count four" counter 68 from cycling in response to the incoming transmit request or TR pulses. This is done by applying a third input to the AND gate 56 which comprises the output of an inverter 150. The inverter is driven whenever the recode gates recognize 1000. In response thereto, its output inhibits AND gate 56. As a result, despite the fact that the "divide by four" circuit 52 cycles, no clock pulses can be applied through the AND gate 56 to the "count four" counter. Also, it is desired to remove the TR signal so that the "count four" counter is not blocked. This is achieved by connecting the 1000 output of the decode gates to a reset driver amplifier 152. The output of this circuit resets the four-bit shift register 30 to its 0000 state. The output of the 1000 line, which hereafter is designated as TR, is also applied to an inverter 154; the output accordingly is designated as $\overline{TR}$.

Figure 6:
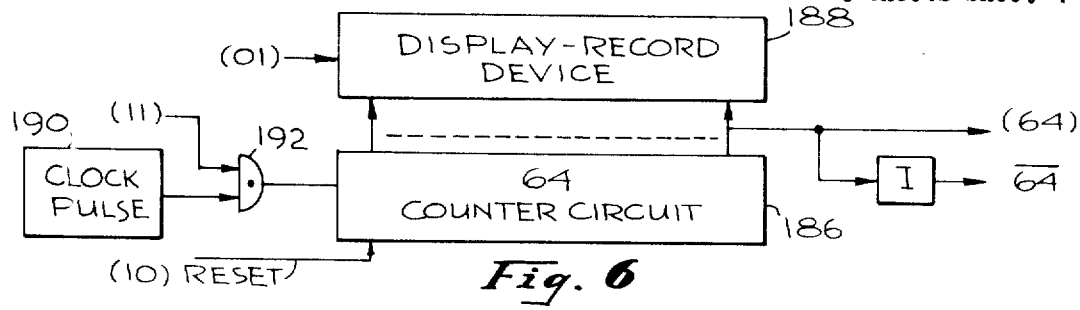
FIG. 6 is a block diagram of the display arrangement used for indicating feedrate override.
Figure 5:
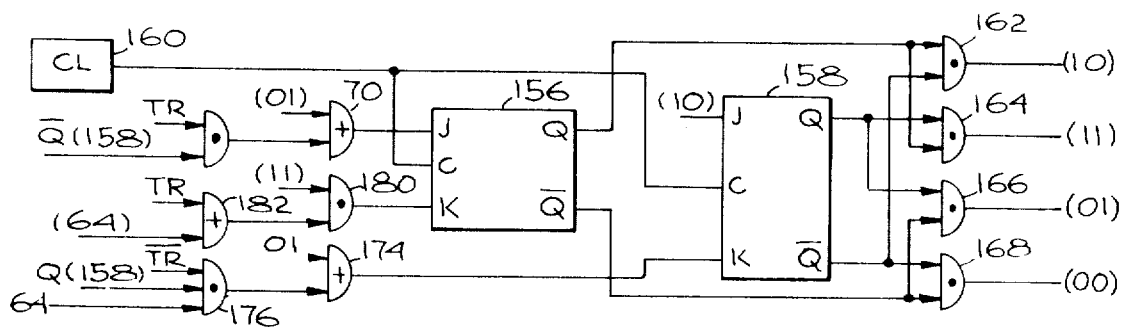
FIG. 5 is a schematic diagram of logic used for measuring feedrate override.

FIG. 5 is a block schematic diagram of the logic required for controlling the decoding circuitry as shown in FIG. 6, whereby the feedrate override may be measured.

FIG. 6 is a block schematic diagram of the feedrate override decoding and display circuits.

FIG. 5 shows two JK flip-flops, respectively 156 and 158. One megacycle pulses from a clock pulse source 160 are applied to the clock input terminals of these two flip-flops. For AND gates, respectively 162, 164, 166, and 168, collect the outputs from the Q and $\overline{Q}$ terminals of flip-flops 156 and 158. AND gate 162, whose output represents 10, has the Q output of flip-flop 156 and the $\overline{Q}$ output of flip-flop 158 connected to its input. AND gate 164, whose output represents 11, collects both Q outputs of flip-flops 156 and 158. AND gate 166, whose output represents 01, collects the $\overline{Q}$ output of flip-flop 156 and the Q output of flip-flop 158. AND gate 168, whose output represents 00, connects both $\overline{Q}$ outputs of flip-flops 156 and 158.

An OR gate 170 has its output connected to the J input of flip-flop 156. One input to this OR gate is the "01" output of AND gate 166. The other input to this OR gate is the output of an AND gate 172 whose input comprises the TR signal and a $\overline{Q}$ output of flip-flop 158.

The K input terminal of flip-flop 158 has an AND gate 180 connected thereto. One input to the AND gate is a "11" output of AND gate 164. The other input is the output of an OR gate 182. The input to this OR gate is a TR signal, and a "64" signal. The J terminal of flip-flop 158 has the "10" output of AND gate 162 connected thereto. The K input to flip-flop 158 has as its input the output of an OR gate 174. One input to this OR gate is the output of an AND gate 176, which has as one of its inputs the Q output of flip-flop 158, a "64" signal and a $\overline{TR}$ signal. A second input to OR gate 174 is the "01" output of an AND gate 166.

In FIG. 6 there is represented a 64 count counter 186, which drives a display-record device 188 with its output. The display may be visual, for example, its count over an interval between two TR pulses. The record may be any suitable digital recording device which prints the output of the counter upon the receipt of a TR pulse signal.

The counter is driven by clock pulses from a source 190 (200 cycles per second, by way of example). The clock pulses are applied to an AND gate 192, which has as its other required input the "11" output signal of AND gate 164.

Assume now that a TR signal is received. If the $\overline{Q}$ output of flip-flop 158 is high, then the flip-flop 156 has its J input high, whereupon it is driven to its state whereby its Q output is high. This provides a "10" output signal at the output of AND gate 162, whereupon the counter 186 is reset. The "10" output of AND gate 162 enables flip-flop 158 to be driven to the state whereby its Q output is high, whereupon the "11" output of AND gate 164 is applied to AND gate 192 in FIG. 6 to enable the counter 186 to commence counting. Upon the arrival of the next TR pulse, and with AND gate 180 providing an output, flip-flop 156 is driven to its 0 state. The display device displays the count, and a record is made thereof. The "01" output of AND gate 166 enables OR gates 170 and 174, and their outputs are applied to the J input of flip-flop 156 and the K input of flip-flop 158, respectively, causing flip-flops 156 and 158 to be driven to their 1 and 0 states, respectively, by the next clock pulse. This results in a 10 output of AND gate 162, which resets counter 186. Upon the next clock pulse, the 10 signal at the J input of flip-flop 158 will cause it to change to the 1 state and will cause a 11 output from AND gate 164, which enables AND gate 192, causing counter 186 to commence counting again. Upon receipt of the next TR signal, the cycle of display, count, resetting, and enabling counter to commence counting is repeated.

Should the counter attain its 64 count before the next TR pulse occurs, indicative of the fact that the machine tool is stopped, since the interval between TR pulses should not afford a full 64 count at the lowest feedrate override setting, then AND gate 176 is enabled and AND gate 180 is enabled by the output of OR gate 182. This will cause the flip-flops 156 and 158 to be driven to their zero states, whereupon AND gate 168 can provide a "00" output which enables the display device to indicate that the machine is stopped.

The count of the counter which is displayed and recorded can indicate the percentage of feedrate override, the larger the count, the greater the feedrate override.

There has accordingly been described and shown hereinabove a novel and useful arrangement wherein information permitting management and supervisory control may be gathered at a central location from a plurality of numerically controlled machine tools which are being time-shared controlled from said central location.

The embodiments of the invention in which an exclusive property or privilege is claimed are defined as follows:

1. In a system wherein a machine tool is located at a distance from a central processing location, the combination of:

means associated with said machine tool for generating and transmitting to said central processing location first signals indicative of a part to be machined and second signals indicative of operations which are performed in connection with the machining of said part;

means at said central processing location for receiving said first and second signals;

storage means at said central processing location for storing at a predetermined address thereof past data accumulated during previous operations in the making of other similar parts;

means at said central processing location responsive to said first signals for accessing the past data stored at said predetermined memory address of said storage means and for producing past data signals representative thereof;

means at said central processing location responsive to said second signals for generating third data signals representative of the operations being performed in the machining of said part;

means at said central processing location for combining said third data signals with said past data signals to provide combined data signals; and means at said central processing location for storing said combined data signals back into said storage means at said predetermined address.

2. In a system wherein a numerically controlled machine tool is located remotely from a central processing location which is to provide control signals to said machine tool whereby it can machine a part:

means associated with said machine tool for generating and transmitting to said central processing location first signals representative of a part to be machined;

means at said central processing location for receiving said first signals;

storage means at said central processing location for storing at respective predetermined addresses cumulative data signals indicative of previous operations which have occurred on parts in the course of machining;

means at said central processing location responsive to said first signals for reading out from the respective predetermined address of said storage means the cumulative data pertaining to said part and for producing cumulative data signals representative thereof;

means associated with said machine tool for generating and transmitting to said central processing location second signals representative of occurrences in the course of the machining of said part;

means at said central processing location including means responsive to said second signals, for updating said cumulative data signals read out of said storage means; and means at said central processing location for writing said updated cumulative data signals into said storage means at the respective predetermined address at the termination of a machining operation on said part.

3. In a system as recited in claim 2, wherein:

the second signals which are generated and transmitted from said machine tool location to said central processing location for a part include a set-up time signal, a run time signal, and a part complete time signal, and wherein said means at said central processing location for reading out of the respective predetermined address of said storage means the cumulative data signals pertaining to said part includes first and second register means for storing set-up time data signals and run-time data signals;

said means for updating said cumulative data signals includes timing means;

means responsive to said set-up time signals and run-time signals to enable said timing means to time the interval between receiving said set-up time signal and said run-time signal;

means for adding the output of said timing means for the interval elapsing between said set-up time signal and said run-time signal to the contents of said first register means;

means for enabling said timing means to time the interval between said run-time and said part complete signal; and means for combining the output of said timing means over the interval between run time and part complete signals with the contents of said second register means.

4. In a system as recited in claim 2, wherein:
the signals which are generated and transmitted from said machine tool location to said central processing location for a part include request signals requesting control signals for commanding machine tool operation for predetermined intervals of time, each said request signal being transmitted at the completion of the motion commanded by said control signals;
timing means at said central processing location for timing the interval between request signals; and
means at said central processing location responsive to output from said timing means to indicate the amount of feedrate override at said machine tool location as indicated by the duration of the interval between request signals.

5. In a system wherein a machine tool transmits request signals to a remotely located central processing location which, in response to each request signal, sends control signals for commanding tool operation for a predetermined period of time, each said request signal being transmitted at the completion of the motion commanded by said control signals;
timing means coupled to said central processor for timing the intervals between request signals; and
means cooperating with said timing means for displaying the output of said timing means as an indication of the feedrate override.

6. In a system wherein a machine tool is located at a distance from a central processing location, the combination of:
means associated with said machine tool for generating and transmitting to said central processor set-up signals, part identifying signals, and machine tool operation signals;
means at said central processing location for receiving said set-up signals, part identifying signals, and machine tool operation signals;
memory means at said central processing location for storing, for each different part, at predetermined locations identified by part identifying signals past data signals indicative of the past performance of said machine tool in the manufacture of different parts;
address register means at said central processing location for storing said part identifying signals received from said machine tool location;
means at said central processing location responsive to part identifying signals in said address register means for reading past data signals from said memory means;
read-out register means at said central processing location for storing past data signals read out from the address in said memory means indicated by the contents of said address register means;
means at said central processing location responsive to said machine tool operation signals for generating data signals indicative of the machine tool operation;
means at said central processing location for combining said past data signals with said generated data signals to produce cumulative data signals; and
means at said central processing location responsive to said set-up signals to write said cumulative data signals back into said memory at the location identified by the contents of said address register means.

7. In a central supervisory data gathering system for a plurality of remotely located numerically controlled machine tools:
means associated with each machine tool for generating and transmitting to said central supervisory data gathering system set-up signals, part identifying signals, and machine tool operation signals; and
processing means at a central location including memory means for storing for each different part, at predetermined locations identified by part identifying signals, past data signals indicative of the past performance of said machine tool in the manufacture of different parts;
said processing means also including for each machine tool location:
address register means for storing the part identifying signals received from its machine tool location;
means responsive to said part identifying signals entered into address register means for reading out the past data signals stored at the location identified by said part identifying signals;
read-out register means for storing the past data signals read out of said memory means;
means responsive to said machine tool operation signals for generating data signals indicative of the machine tool operation;
means for combining said past data signals with said generated data signals to produce cumulative data signals; and
means responsive to said set-up signals to write said cumulative data signals back into said memory means at the location identified by the contents of said address register means.

8. In a system for controlling a remotely located machine tool having a feedrate override capability, the combination of:
processing means at a central location responsive to signals received from the remote location for transmitting selected predetermined control signals to the machine tool during spaced time intervals for controlling machine tool motion including feedrate during each interval, the transmission by said processing means of the control signals for each subsequent interval being initiated in response to the receipt of a request signal from the machine tool location indicating that the operations required during the previous interval have been completed; and
control means associated with a machine tool at the remote location for transmitting said request signal to said processing means at the completion by the machine tool of the motion commanded by the control signals in each interval, the time required for completion being determined by the actual feedrate employed by the machine tool during the interval taking into account any feedrate override which may be employed;
said processing means also including means responsive to said request signals from the machine tool for providing an indication of the feedrate override employed thereby.

References Cited
UNITED STATES PATENTS

| 3,344,408 | 9/1967 | Singer et al. | 340—172.5 |
| 3,465,298 | 9/1969 | Duke et al. | 340—172.5 |

RAULFE B. ZACHE, Primary Examiner

U.S. Cl. X.R.

235—151.11